United States Patent
Casey et al.

(10) Patent No.: US 12,032,591 B2
(45) Date of Patent: Jul. 9, 2024

(54) CONTENT DELIVERY USING DISTRIBUTED LEDGER AND AI-BASED TRANSCODING TECHNOLOGIES

(71) Applicant: CenturyLink Intellectual Property LLC, Broomfield, CO (US)

(72) Inventors: Steven M. Casey, Littleton, CO (US); Stephen Opferman, Denver, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 234 days.

(21) Appl. No.: 17/481,366

(22) Filed: Sep. 22, 2021

(65) Prior Publication Data
US 2022/0092079 A1    Mar. 24, 2022

Related U.S. Application Data

(60) Provisional application No. 63/082,704, filed on Sep. 24, 2020.

(51) Int. Cl.
*G06F 16/00* (2019.01)
*G06F 16/215* (2019.01)
*G06F 16/27* (2019.01)

(52) U.S. Cl.
CPC .......... *G06F 16/27* (2019.01); *G06F 16/215* (2019.01)

(58) Field of Classification Search
CPC ............................... G06F 16/27; G06F 16/215
See application file for complete search history.

(56) References Cited

U.S. PATENT DOCUMENTS

| | | | |
|---|---|---|---|
| 10,855,475 B1* | 12/2020 | Leach | H04L 9/0637 |
| 2012/0191805 A1 | 7/2012 | Fee | |
| 2019/0028705 A1 | 1/2019 | Xu | |
| 2019/0354943 A1* | 11/2019 | Mulye | H04L 9/3226 |
| 2020/0242215 A1* | 7/2020 | Zou | H04L 9/0643 |

(Continued)

FOREIGN PATENT DOCUMENTS

| | | |
|---|---|---|
| EP | 1195992 | 4/2002 |
| WO | WO-2007073616 | 7/2007 |
| WO | WO-2016209125 | 12/2016 |

OTHER PUBLICATIONS

International Search Report and Written Opinion of the International Searching Authority, dated Feb. 1, 2022, Int'l Appl. No. PCT/US21/051482, Int'l Filing Date Sep. 22, 2021; 17 pgs.

(Continued)

*Primary Examiner* — Khanh B Pham

(57) ABSTRACT

Examples of the present disclosure relate to content delivery using distributed ledger and AI-based transcoding technologies. In examples, a content distribution network (CDN) receives content from a content source for distribution to client devices. A content record is generated for the content, which comprises a content hash for the content. The content record may be stored in a distributed ledger. A smart contract associated with the content may be generated, where the smart contract facilitates CDN analytics or accounting for CDN service payments, licensing fees, or royalty payments, among other examples. The smart contract may be associated with the content hash and may be executed based on any of a variety of triggers, such as content playback and/or distribution via the CDN.

15 Claims, 8 Drawing Sheets

(56) References Cited

U.S. PATENT DOCUMENTS

| | | | |
|---|---|---|---|
| 2021/0176221 A1* | 6/2021 | Li | G06Q 20/123 |
| 2021/0227011 A1* | 7/2021 | Long | H04L 65/1069 |
| 2021/0243329 A1* | 8/2021 | Sohma | H04N 1/32021 |
| 2022/0083507 A1* | 3/2022 | Crowell | H04L 9/3236 |

OTHER PUBLICATIONS

International Preliminary Report on Patentability, dated Apr. 6, 2023, Int'l Appl. No. PCT/US2021/051482, Int'l Filing Date Sep. 22, 2021; 12 pgs.

* cited by examiner

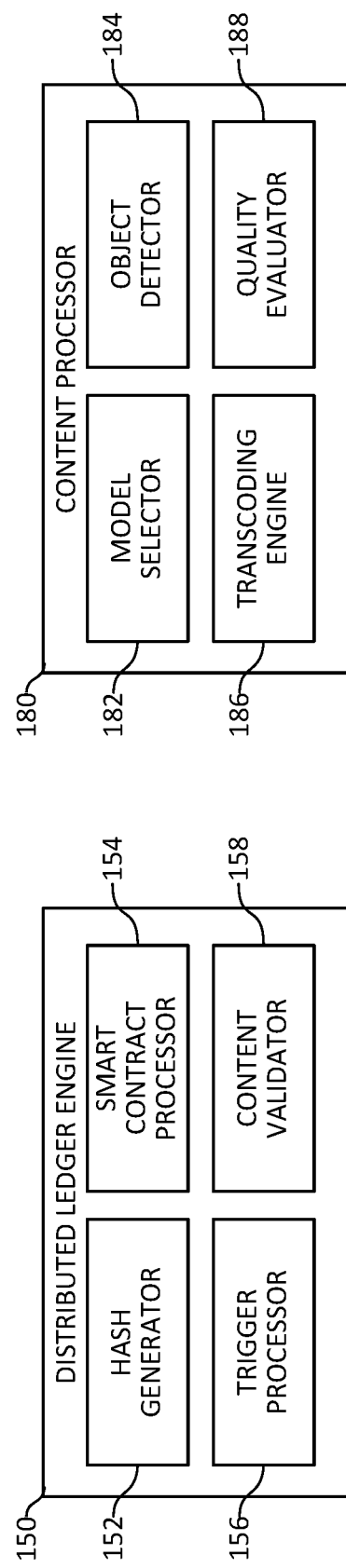

CONTENT DELIVERY USING DISTRIBUTED LEDGER AND AI-BASED TRANSCODING TECHNOLOGIES

CROSS-REFERENCE TO RELATED APPLICATIONS

This application claims the benefit of U.S. Provisional Application No. 63/082,704 filed 24 Sep. 2020, entitled "Content Delivery Using Distributed Ledger and AI-Based Transcoding Technologies," which is incorporated herein by reference in its entirety.

BACKGROUND

Complexities associated with adding content for distribution via a content distribution network (CDN) may result in increased overhead, unnecessary delays, and introduce the potential for human error. Additionally, content received from a publisher or other content source may not be at a level of quality that may otherwise be available via the CDN for consumption by consumers. For example, the content may be at a lower resolution or have fewer audio channels.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure relate to content delivery using distributed ledger and AI-based transcoding technologies. In examples, a content distribution network (CDN) receives content from a content source for distribution to client devices. A content record is generated for the content, which comprises a content hash for the content. The content record may be stored in a distributed ledger. A smart contract associated with the content may be generated, where the smart contract facilitates CDN analytics or accounting for CDN service payments, licensing fees, or royalty payments, among other examples. The smart contract may be associated with the content hash and may be executed based on any of a variety of triggers, such as content playback and/or distribution via the CDN.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1B illustrates an overview of an example distributed ledger engine.

FIG. 1C illustrates an overview of an example content processor for performing AI-based transcoding.

DETAILED DESCRIPTION

Figure 1A:
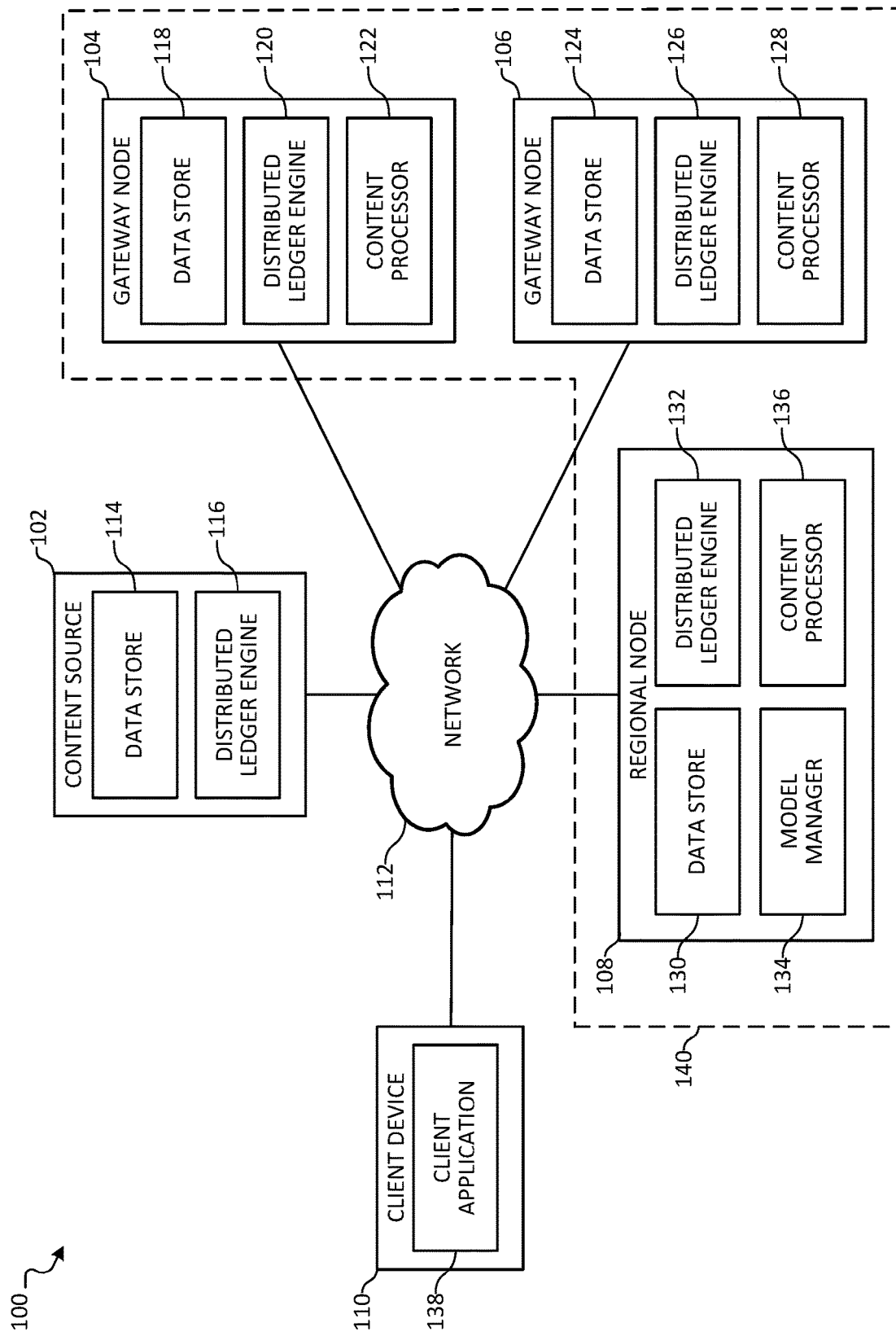
FIG. 1A illustrates an overview of an example system in which aspects of content delivery using distributed ledger and AI-based transcoding technologies are performed.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

A content distribution network (CDN) comprises a set of nodes used to process requests from client devices. For example, the CDN may distribute content from a content source, such as a content publisher, a video on demand (VOD) service, or a streaming platform. Accordingly, content from the content provider is accessed by a consumer using a client device via the CDN. However, adding content to the CDN may have associated overhead, such as agreeing to terms and conditions (e.g., between a content source and the CDN), preparing contracts and billing arrangements (e.g., with the content source, for royalty payments, etc.), validating the received content and the provided services, and ultimately processing payments.

Additionally, content received from a content source may be at a quality level below that which is available via the CDN. For example, the content source may provide "HD" content (e.g., having a resolution of 1280×720 or 1920× 1080), while the CDN may distribute content in higher-resolution formats, such as "4K" (e.g., 3840×2160, 4096× 2160, etc.) or "8K" (e.g., 7680×4320, 8192×5120, etc.). Similar issues may exist with respect to audio (e.g., as a standalone audio track, alongside a video track/stream, etc.), where the content source provides audio having a lower number of channels (e.g., 2.0 vs. 5.1 or 7.1), a lower bit depth (e.g., 16-bit vs. 24-bit), a lower bitrate, and/or a different codec (e.g., a codec having discrete tracks versus an object-based spatial audio codec) than may be distributed by the CDN.

Accordingly, aspects of the present disclosure relate to content delivery using distributed ledger and artificial-intelligence-based (AI-based) transcoding technologies. In examples, a hash is generated for content received from a content source. The hash is incorporated as a content record into a distributed ledger (e.g., a block of a blockchain), thereby ensuring the hash is immutable and available for subsequent processing. For example, the stored hash may be used to perform content validation, thereby verifying the source of the content, title of the content, and/or actors/actresses, directors, or other artists associated with the content. Such metadata may be stored with the content hash, or the metadata may be stored in a data store and associated with the content hash.

As another example, a smart contract may be generated and associated with the content hash. For example, the smart contract may be for CDN services associated with the content (e.g., storage services, distribution services, content transcoding services, etc.), for licensing from a content source (e.g., payments for content playback based on content quality), and/or for royalties (e.g., music royalties, actor/actress royalties, director royalties, etc.). A trigger may be associated with the smart contract, such that the smart contract is executed as a result of the trigger. Example triggers include, but are not limited to, distribution of the content via the CDN and initiation of content playback at a client device. Accordingly, the distributed ledger may be used to ensure the parties to the smart contract uphold their obligations and receive payments upon certain conditions (e.g., CDN service payments for distribution, royalty payments for content playback, etc.).

AI-based transcoding techniques are used to transcode content received from a content source that is in a lower-quality or a different format than may be distributed via the CDN. For example, the CDN may distribute 4K or 8K content, such that HD or standard definition (SD) content received from a content source is upscaled according to the AI-based transcoding techniques described herein. As a result, the content source need not purchase expensive video equipment or more powerful computer hardware to process higher-quality video data, but may instead utilize such functionality provided by the CDN. Additionally, content may be distributed in a lower-resolution format (e.g., as was received from the content source) within the CDN (e.g., to edge nodes via an origin node), and the content may be upscaled at edge nodes prior to or contemporaneously with distribution to client devices. Such techniques may conserve bandwidth and storage requirements associated with distributing the content via the CDN, while still providing a high-quality end-user experience.

As used herein, content includes, but is not limited to, video and/or audio as a stream or as a file, among other examples. For example, a video file or stream may comprise one or more audio tracks. As another example, a file or stream may be video-only or audio-only. A stream need not be a real-time or live stream, and may be a stream of prerecorded content. For example, streaming content may be received by the CDN from a content source in subparts (e.g., using Dynamic Adaptive Streaming over HTTP (DASH) or Real-time Transport Protocol (RTP), etc.). A content source may be a publisher (e.g., a movie studio, a television studio, etc.), a VOD service, or a streaming platform, among other examples. Thus, while example content and content sources are described herein, it will be appreciated that the instant techniques may be applied to any of a variety of other content and content sources.

Content may be received from a content source via a website. For example, the website may enable a user to select the content and specify associated metadata such as a title and a list of actors/actresses, directors, or other associated artists. Other techniques may be used to receive content from a content source, such as using an application programming interface (API). In some examples, metadata may be retrieved from another data source, such as a metadata repository managed by the content source or a third-party metadata repository. Accordingly, the content may be transferred to the CDN, where a content record associated with the content is generated in a distributed ledger. The content record comprises a content hash, which may be generated using any of a variety of hashing algorithms. Example hashing algorithms include, but are not limited to, a Secure Hash Algorithm 2 (SHA-2) hash (e.g., SHA-256, SHA-512, etc.) or a RIPE Message Digest (RIPEMD) hash (e.g., RIPEMD-160, RIPEMD-256, etc.). The content hash may be generated based on the content itself, rather than based on the metadata either alone or in combination with the content.

The content hash may be stored in a distributed ledger, such as in a block of a blockchain. In some examples, the content record further comprises at least a part of the metadata associated with the content. In other examples, the metadata may be stored in a metadata repository or other data store, and associated with the content hash. The metadata may similarly be hashed, and the metadata hash may be stored as part of the content record, such that subsequent validation of the metadata may be performed. The content record may further comprise a timestamp associated with when the content was received by the CDN, as well as associated content source information (e.g., an email address, a billing address, a company name, etc.).

One or more smart contracts associated with the content may be generated. For example, the CDN and the content source may be parties to a smart contract, where the CDN receives compensation for distributing the content and the content source receives compensation for playback of the content. In other examples, a smart contract may be entered into between the CDN or content source and one or more other parties, such as musicians, actors/actresses, and directors, thereby enabling such parties to receive royalty payments. In some instances, a smart contract is used where the CDN is the only party to the contract, thereby enabling the CDN to maintain analytics in the distributed ledger based on the occurrence of triggers.

A smart contract may be part of the distributed ledger in which the content hash is stored or, in other examples, may be a different distributed ledger. For example, different distributed ledgers may be used for different parties (e.g., different distributed ledgers for each content source, using the same distributed ledger to track royalty payments to a specific artist, etc.). As another example, a content source may maintain its own distributed ledger, such that a ledger gateway may be used to synchronize transactions among the content source ledger and a CDN ledger or provide indications as to triggers, among other examples.

It will be appreciated that a party to a smart contract need not be an actual user of the distributed ledger but may instead serve as a placeholder. For example, a royalty smart contract may be usable to generate an accounting of royalty payments associated with content, which may be provided to a content source or other party, thereby ultimately resulting in payment of royalties. Thus, the smart contract and distributed ledger techniques described herein may not result in an exchange of actual value but may instead facilitate accounting techniques relating to content that is distributed by the CDN.

A trigger may be any of a variety of events, such as events relating to content distribution (e.g., transmission to a client device, between an origin and edge node, streaming or downloading activity, etc.) or content playback (e.g., playing/pausing content, fast-forwarding/rewinding, ending playback early, etc.). When a trigger is identified, the content hash associated with the trigger is used to identify and execute an associated smart contract. It will be appreciated that while example distributed ledger and smart contract techniques are described herein, any of a variety of other techniques may be used to generate and execute smart contracts associated with content that is distributed by a CDN. For example, a content hash need not be used, and identifiers associated with smart contracts may instead be associated with the content itself.

A distributed ledger may be processed to generate an accounting of payments that are due to parties of the smart contracts therein. Such processing may be performed periodically (e.g., monthly, semi-annually, etc.) and an indication of the accounting may be provided to a content source or other party. For example, the content source may receive the indication and subsequently process royalty payments accordingly. As another example, the content source may receive the indication and process payment to the CDN for CDN services rendered in distributing content.

The distributed ledger may also be used to perform validation relating to the content. For example, a consumer may wish to validate the source of the content or, in other examples, may wish to validate certain metadata associated with the content (e.g., that an actor/actress portrayed in the content was actually involved in its creation). Accordingly, the content may be hashed (e.g., at the client device of the consumer, at a node of the CDN, etc.) and a content hash associated with the content may be identified in the distributed ledger. The content hash may further be used to identify metadata associated with the content, thereby enabling the user to view a content source associated with the content and associated metadata.

As noted above, content from a content source may be low quality or may be in a different format than may be distributed by the CDN. Accordingly, AI-based transcoding techniques may be used to improve or alter the content. In examples, a set of transcoding models are used to perform upscaling or other video enhancement techniques. The set of transcoding models may have been trained according to different content types. For example, different transcoding models may exist for action content, sports content, animated content, reality content, advertising content, and black & white content. A transcoding model is selected from the set of models according to a variety of criteria, including, but not limited to, content metadata (e.g., a genre, an actor/actress that may be indicative of a certain content type, etc.), video analysis (e.g., bitrate, frame complexity, lightness/darkness, etc.), original content resolution, target content resolution, motion vectors, production year, format or codec type, and/or feedback that was received from consumers or other users.

In examples, multiple transcoding models are compared to determine which transcoding model to apply. For example, object detection (e.g., inanimate objects, animated characters, actors/actresses, etc.) may be performed, such that a model processing result from multiple transcoding models may be compared based at least in part on how well the detected object was transcoded. The comparison may be automatic (e.g., detecting transcoding artifacts, comparing a reference frame to the transcoded frame, etc.) and/or manual (e.g., presenting multiple transcoded frames for user selection, soliciting user feedback regarding encoding quality after or during playback, etc.). For example, a source frame may be downscaled, such that the downscaled source frame is upscaled using multiple transcoding models to generate multiple transcoded frames. The transcoded frames may be compared to the original source frame to identify errors and quality loss, such that the transcoding model exhibiting the highest quality (e.g., lowest error, lowest quality loss, etc.) may be selected to transcode the content.

In examples, multiple transcoding models are used to transcode a single piece of content, where one model may be used for one subpart of the content, while another model may be used for a different subpart. For example, a sports broadcast may be processed using a sports transcoding model, an advertisement transcoding model, and a "talking heads" or commentary transcoding model. As noted above, different transcoding models may be better-suited for different content types. Transcoding model performance may be evaluated periodically during transcoding, such that the transcoding model may be changed depending model performance for a given subpart. In some examples, content resolution may change (e.g., between sports segments of a broadcast and advertisements therein), which may signal that model performance should be reevaluated. In other examples, object detection may be used to determine the content of a video frame or identify when an object has disappeared, both of which may indicate that transcoding model performance should be reevaluated. In some instances, the transcoding model that is applied for transcoding content may be reevaluated on a frame-by-frame basis or according to any other level of granularity (e.g., every keyframe or intraframe, after a predetermined number of frames, etc.). Additionally, different transcoding models may be applied to intraframes, predicted-frames, and/or bidirectional-frames. Thus, it will be appreciated that a variety of techniques may be used to determine when to shift from one transcoding model to another transcoding model in order to transcode content. Similarly, such techniques need not be performed contemporaneously with transcoding, but may be performed as a pre-processing operation that generates a transcoding "recipe" that specifies which transcoding models should be used to transcode which subparts of content.

It will be appreciated that similar techniques maybe applied to audio, for example to audio-only content, or as part of video content. Similar to the video techniques described above, multiple audio transcoding models may be evaluated to determine which audio transcoding model should be applied. The evaluation may comprise identifying audio artifacts (e.g., that are within a human range of hearing), a resulting bitrate of the transcoding audio, errors and/or quality loss. In examples, evaluating which audio transcoding model to apply occurs contemporaneously with the video transcoding model evaluation discussed above. Thus, an event that results in re-evaluation of the video transcoding model may similarly result in re-evaluation of the audio transcoding model. Similarly, an event that results in re-evaluation of the audio transcoding model may result in re-evaluation of the video transcoding model. In other instances, audio and video transcoding models are re-evaluated separate from one another. A video transcoding model may be associated with an audio transcoding model, such that both transcoding models are used to process the same type of content.

FIG. 1A illustrates an overview of an example system 100 in which aspects of content delivery using distributed ledger and AI-based transcoding technologies are performed. As illustrated, system 100 comprises content source 102, gateway node 104, gateway node 106, regional node 108, client device 110, and network 112. Content source 102, gateway node 104, gateway node 106, regional node 108, and client device 110 are illustrated communicating through network 112. Network 112 may comprise a local area network, a wide area network, one or more cellular networks, and/or the Internet, among other examples. Nodes 104, 106, and 108 are illustrated as comprising similar elements (e.g., data stores 118, 124, and 130; distributed ledger engines 120, 126, and 132; and content processors 122, 128, and 136). As a result, such similar aspects may not necessarily be re-described below in detail for each node.

Content source 102 provides content to CDN 140 (e.g., comprising gateway nodes 104 and 106, and regional node 108, as illustrated by the dashed box) for distribution to consumers (e.g., using client application 138 of client device 110). For example, a computing device associated with content source 102 may be used to access a website hosted by CDN 140 (e.g., as may be provided by node 104, 106, or 108) to provide the content according to aspects described herein. Any of a variety of other techniques may be used to transmit content from content source 102 to CDN 140. It will be appreciated that, in other examples, certain elements of the example CDN described with respect to system 100 may be provided by a third party and/or functionality described herein with respect to specific elements may be distributed according to any of a variety of other techniques.

Content source 102 is illustrated as comprising data store 114 and distributed ledger engine 116. In examples, data store 114 stores content that content source 102 provides to CDN 140. For example, data store 114 stores content files and/or buffers content streams, among other examples. Distributed ledger engine 116 may manage a distributed ledger associated with content source 102. For example, content source 102 may maintain its own distributed ledger comprising records associated with content that it provides. In other examples, a content source may not comprise a distributed ledger engine.

Using gateway node 104 as an example, content is received from content source 102 and stored in data store 118. Distributed ledger engine 120 generates a content record in a distributed ledger, where the content record may comprise a content hash, associated metadata, and/or any of a variety of other information. In examples, content metadata is stored in data store 118 and is associated with the content hash. In some examples, distributed ledger engine 120 generates one or more smart contracts associated with the content, which may be stored in the same or a different distributed ledger as the content record. In examples, generated smart contracts are associated with the content hash and/or one or more triggers. In some examples, distributed ledger engine 120 may act as a gateway between a CDN distributed ledger and a content source distributed ledger managed by distributed ledger engine 116. For example, transactions may be synchronized among the content source ledger and a CDN ledger or, as another example, indications may be provided as to triggers identified within CDN 140, among other examples.

Gateway node 104 may transmit the content to regional node 108. Gateway nodes 104 and 106 may distribute content from regional node 108, such that the content received from content source 102 and provided to regional node 108 via gateway node 104 may subsequently be distributed by gateway node 106. Thus, CDN 140 may have a hierarchical or hub-and-spoke architecture, where certain nodes (e.g., nodes 104 and 106) are managed by other nodes (e.g., regional node 108). While example CDN structures are described herein, it will be appreciated that nodes may be configured in any of a variety of other structures in other examples.

A consumer uses client application 138 of client device 110 to access content of CDN 140 (e.g., as may be provided to CDN 140 by content source 102). Client application 138 may be a web browser or an application developed or otherwise provided by content source 102, among other examples. Accordingly, client device 110 communicates with one or more of nodes 104, 106, and 108 to access content. In some examples, client device 110 initially communicates with content source 102 (e.g., to access a listing of content, as may be provided via a website), after which client device 110 may be directed to CDN 140 to access a selected piece of content that is provided by CDN nodes 104, 106, and/or 108. As the content from content source 102 is transferred within CDN 140 and/or provided to client device 110, one or more triggers may occur. For example, a consumer may cause a playback trigger to occur via client application 138 by requesting content from CDN 140. Accordingly, a distributed ledger engine identifies the trigger and executes a smart contract associated based at least in part on a hash of the associated content. For example, distributed ledger engine 120, 126, or 132 may perform such aspects. Executing the smart contract may result in an update to the distributed ledger associated with the trigger. As another example, a trigger may occur when the content is transmitted from data store 130 of regional node 108 to gateway node 106, such that a smart contract is executed (e.g., by distributed ledger engine 132 or 126) associated with bandwidth and/or storage usage associated with transmitting and storing the content.

In examples, the distributed ledger is processed to determine payments that are due to parties of the smart contracts therein (e.g., content source 102, CDN 140, artists, etc.). For example, distributed ledger engine 132 of regional node 108 may perform such processing periodically (e.g., monthly, semi-annually, etc.) and an indication may be provided to content source 102 and/or one or more other parties. For example, content source 102 may receive the indication and may subsequently process royalty payments accordingly. As another example, content source 102 may receive the indication and process payment to CDN 140 for CDN services associated with distributing the content. In some instances, distributed ledger engine 132 provides a website, API, or other method for accessing such aggregated payment information, managing smart contracts, and/or remitting payment. It will be appreciated that gateway nodes 104 and 106 may perform similar aspects in other examples. As another example, gateway nodes 104 and 106 may be managed by regional node 108, such that regional node 108 performs the above-described processing techniques on behalf of gateway nodes 104 and 106.

In examples, content validation is requested. For example, a validation request is received from client device 110 or, as another example, the content is validated as a result of generating an accounting of a distributed ledger. As another example, a consumer may wish to validate the source of the content or, in other examples, may wish to validate certain metadata associated with the content (e.g., that an actor/actress portrayed in the content was actually involved in its creation). Accordingly, a hash of the content is generated (e.g., at client device 110, at node 104, 106, or 108, etc.) and compared to content record of the distributed ledger. Such aspects may be performed by distributed ledger engine 120, 126, and/or 132. If the generated content hash matches the stored content hash of the content record, the content is validated successfully. The content hash may further be used to identify metadata associated with the content, thereby enabling the user to view a content source associated with the content and associated metadata.

Content from content source 102 may be low quality or may be in a different format than may be distributed by CDN 140. Accordingly, content processors 122, 128, and/or 136 may be used to improve or alter the content. As an example, gateway node 104 (which received the content from content source 102) uses content processor 122 to perform the AI-based transcoding techniques described herein to generate a transcoded version of the content. The transcoded version may be distributed to other nodes of CDN 140 (e.g., gateway node 106 via regional node 108). The content may be transcoded in response to receiving the content from content source 102.

In other examples, the original content is distributed to nodes of CDN 140, such that node 104, 106, or 108 uses content processor 122, 128, or 136, respectively, to perform the AI-based transcoding techniques in response to a request for content (e.g., from client device 110). For example, the request may comprise requested format information that indicates a requested resolution, number of audio channels, bitrate, and/or color depth, among other examples. Thus, the requested format information may relate to video requested format information and/or audio requested format information. Additionally, distributing the original content within CDN 140 and performing transcoding at nodes that process requests for content may reduce the bandwidth associated with transferring the content within CDN 140.

In some examples, at least a part of a transcoded version of content is cached in a data store for a predetermined amount of time, such that a node need not generate a transcoded version in response to every request for the content but may instead provide the cached transcoded version from the data store. In other examples, a transcoded version may be transmitted from one node to another node (e.g., from data store 130 of regional node 108 to data store 118 of gateway node 104), such that the recipient node need not transcode the content. It will be appreciated that the techniques described above with respect to system 100 may be used in instances where content source 102 provides pre-recorded and/or real-time content, among other examples.

Regional node 108 is illustrated as further comprising model manager 134. In examples, transcoding models that are used by content processors 122, 128, and 136 are managed by model manager 134. For example, content processor 122 may retrain or otherwise update a transcoding model that is used to transcode content based on implicit and/or explicit user feedback. Accordingly, the model may be provided to or retrieved by model manager 134, which may distribute the updated transcoding model to other content processors of CDN 140. Thus, transcoding models may be shared among nodes 104, 106, and 108. Similarly, model manager 134 may facilitate sharing of transcoding recipes among nodes 104, 106, and 108. For example, if content processor 128 of gateway node 106 has already analyzed which set of transcoding models should be used to transcode a certain piece of content, model manager 134 may retrieve or otherwise access the transcoding recipe from gateway node 106 and share the transcoding recipe with content processors 122 and 136. Thus, transcoded versions generated by nodes 104, 106, and 108 may be similar as a result of using the same or similar transcoding recipe. It will be appreciated that other techniques may be used to synchronize transcoding models and recipes. For example, a centralized data store may be used.

FIG. 1B illustrates an overview of an example distributed ledger engine 150. As illustrated, distributed ledger engine 150 comprises hash generator 152, smart contract processor 154, trigger processor 156, and content validator 158. In examples, distributed ledger engine 150 is part of a CDN node, such as distributed ledger engines 120, 126, and 132 of nodes 104, 106, and 108, respectively, in FIG. 1A.

Hash generator 152 generates hashes content according to aspects described herein. For example, a content hash may be generated using any of a variety of hashing algorithms, such as a SHA-2 hash (e.g., SHA-256, SHA-512, etc.) or a RIPEMD hash (e.g., RIPEMD-160, RIPEMD-256, etc.). Hash generator 152 may generate a content hash based on the content itself, rather than based on the metadata either alone or in combination with the content. A hash may have multiple subparts, where a first subpart of the hash may uniquely identify the content, while one or more other subparts of the hash may be associated with a content resolution (e.g., different hashes for the subpart for HD, 4K, and/or 8K content) and/or a content source (e.g., a streaming platform may have a different hash subpart than the original content publisher. A content hash generated by hash generator 152 may be stored as part of a content record of a distributed ledger. In some examples, hash generator 152 further generates a hash of metadata associated with the content, which may also be stored as part of a content record. The content record may further comprises at least a part of the metadata associated with the content or any of a variety of other information, including, but not limited to, a timestamp associated with when the content was received by the CDN (e.g., from content source 102 in FIG. 1A), as well as associated content source information (e.g., an email address, a billing address, a company name, etc.).

Smart contract processor 154 of distributed ledger engine 150 generates smart contracts associated with content. As described above, smart contracts may be generated between any of a variety of parties, including, but not limited to, the CDN, a content source, and/or musicians, actors/actresses, and directors, among other artists. Smart contract processor 154 may associated a generated smart contract with a content hash (e.g., as may have been generated by hash generator 152). Smart contract processor 154 may store smart contracts in the same distributed ledger as where content records are stored or, in other examples, smart contracts may be a different distributed ledger. For example, different distributed ledgers may be used for different parties (e.g., different distributed ledgers for each content source, using the same distributed ledger to track royalty payments to a specific artist, etc.). Smart contract processor 154 need not generate smart contracts among distinct users or, in other examples, a party to a smart contract need not be an actual user but may instead serve as a placeholder. For example, a royalty smart contract may be usable to generate a record of royalty payments, which may be provided to a content source or other party, thereby ultimately resulting in payment of royalties. As another example, the CDN is the only party to the contract, thereby enabling the CDN to maintain analytics via the distributed ledger based on the occurrence of triggers.

Trigger processor 156 processes triggers and executes associated smart contracts. As noted above, a trigger may be any of a variety of events, such as events relating to content distribution (e.g., transmission to a client device, between an origin and edge node, streaming or downloading activity, etc.) or content playback (e.g., playing/pausing content, fast-forwarding/rewinding, ending playback early, etc.). For example, trigger processor 156 may perform polling to determine whether an event has occurred (e.g., accessing log data, querying the content of a data store, etc.) or may receive an indication (e.g., from a CDN node, from a client device, etc.). When trigger processor 156 identifies a trigger, a content hash associated with the trigger is used to identify and execute associated smart contracts (e.g., as may have been generated by smart contract processor 154).

Content validator 158 validates content compared to a content hash in a distributed ledger. For example, content validator 158 may receive a validation request (e.g., as a result of processing transactions, from a client device such as client device 110 in FIG. 1A). The validation request may comprise an indication to generate a hash for specific content or may comprise a hash (e.g., as may be generated by a client device). In examples where a hash is not received as part of the request, hash generator 152 generates a hash of the content. Content validator 158 then compares either the received hash or the generated hash to a hash in the distributed ledger to validate the content. As noted above, additional validation may be performed relating to a content source associated with the content and/or metadata.

FIG. 1C illustrates an overview of an example content processor 180 for performing AI-based transcoding. As illustrated, content processor 180 comprises model selector 182, object detector 184, transcoding engine 186, and quality evaluator 188. In examples, content processor 180 is part of a CDN node, such as content processors 122, 128, and 136 of nodes 104, 106, and 108, respectively, in FIG. 1A. Content processor 180 transcodes content from a content source, such as content source 102 in FIG. 1A.

Model selector 182 selects a transcoding model to perform AI-based transcoding. For example, model selector 182 selects a transcoding model from the set of models according to a variety of criteria, including, but not limited to, content metadata (e.g., a genre, an actor/actress that may be indicative of a certain content type, etc.), video analysis (e.g., bitrate, frame complexity, lightness/darkness, etc.), original content resolution, target content resolution, motion vectors, production year, format or codec type, and/or feedback that was received from consumers or other users. As described above, the set of transcoding models may have been trained according to different content types. For example, different models may exist for action content, sports content, animated content, reality content, advertising content, and black & white content.

In examples, model selector 182 compares multiple transcoding models to determine which transcoding model to apply. For example, object detector 184 may identify inanimate objects, animated characters, and actors/actresses, among other objects in a given video frame. Object detector 184 may apply any number and/or variety of object recognition machine learning models. For example, each object recognition machine learning model may have been trained to recognize a specific subset of objects or, in other examples, an object recognition machine learning model is trained according to a specific type of content. It will be appreciated that object detector 184 may apply any of a variety of other object detection techniques (e.g., identifying edges within a frame, analyzing motion across a set of frames, etc.).

Model selector 182 may then evaluate a model processing result from multiple transcoding models using quality evaluator 188 to determine how well the detected object was transcoded by each transcoding model. In examples, quality evaluator 188 makes the comparison programmatically (e.g., by detecting transcoding artifacts, comparing a reference frame to the transcoded frame, etc.). For example, a source frame may be downscaled, such that the downscaled source frame is upscaled using multiple transcoding models to generate multiple transcoded frames. The transcoded frames may be compared to the original source frame to identify errors and quality loss, such that the transcoding model exhibiting the highest quality (e.g., lowest error, lowest quality loss, etc.) may be selected to transcode the content. In other examples, quality evaluator 188 requests or otherwise receives explicit/implicit user input, for example by generating a display of multiple transcoded frames side-by-side for user selection.

Transcoding engine 186 transcodes the content to generate transcoded content. Transcoding engine 186 uses a transcoding model selected by model selector 182 to perform the transcoding. In examples, multiple transcoding models are used to transcode content, where one model may be used for a subpart of the content, while another model may be used for a different subpart. Accordingly, transcoding model performance may be evaluated periodically during transcoding (e.g., by quality evaluator 188), such that the transcoding model may be changed (e.g., according to a selection made by model selector 182) depending model performance for a given subpart. In some examples, content resolution may change (e.g., between sports segments of a broadcast and advertisements therein), such that transcoding engine 186 may determine that model selector 182 should again be used to perform the model selection process. In other examples, object detector 184 may be used to determine the content of a video frame or identify when an object has disappeared, both of which may cause model selector 182 to reevaluate transcoding model performance. In some instances, transcoding engine 186 applies different transcoding models to intraframes, predicted-frames, and/or bidirectional-frames (each of which may be selected by model selector 182). As noted above, such techniques need not be performed contemporaneously with transcoding, such that transcoding engine 186 instead utilizes a transcoding recipe that specifies which transcoding models should be used to transcode which subparts of content.

Figure 2A:
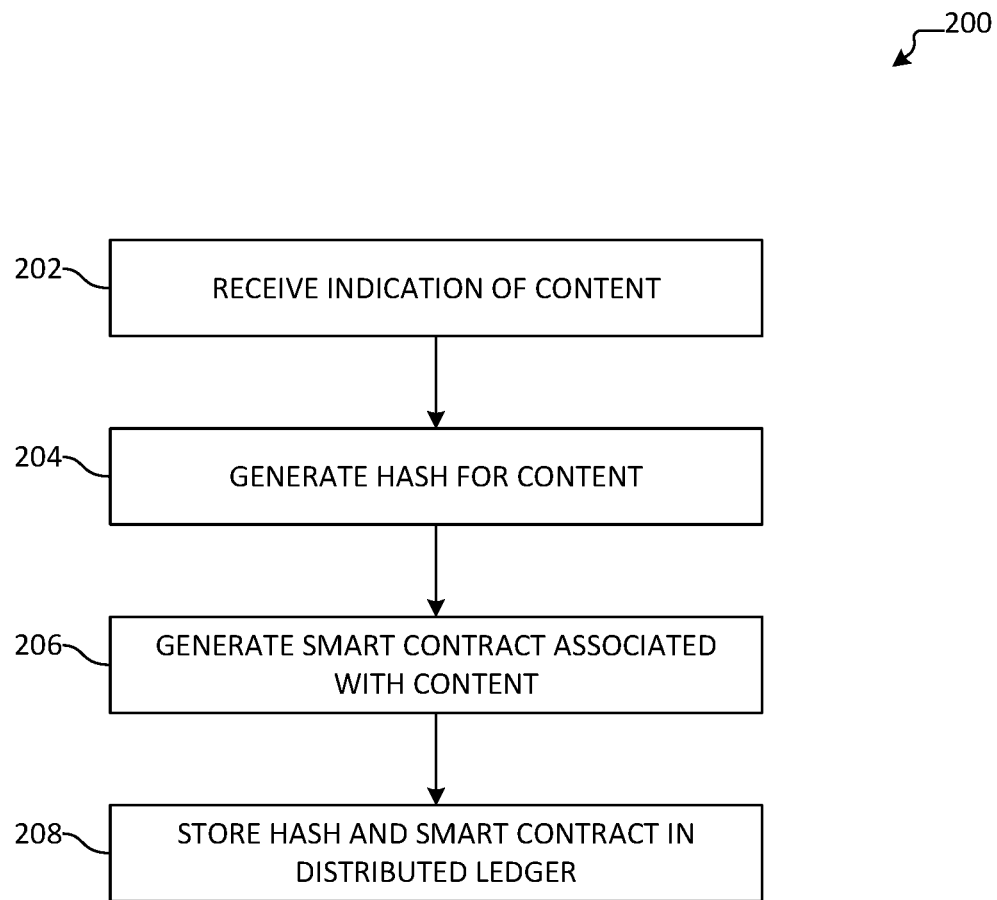
FIG. 2A illustrates an overview of an example method for adding content to a CDN according to the distributed ledger techniques described herein.

FIG. 2A illustrates an overview of an example method 200 for adding content to a CDN according to the distributed ledger techniques described herein. In examples, aspects of method 200 are performed by a node of a CDN, such as node 104, 106, or 108 in FIG. 1A. As another example, aspects of method 200 may be performed by a distributed ledger engine, such as distributed ledger engine 150 in FIG. 1B. Method 200 begins at operation 202, where an indication of content is received. The indication of content may be received from a content source, such as content source 102 in FIG. 1A. As another example, the indication of content may be received via a web site of the CDN that enables a user (e.g., of a client device associated with the content source) to select the content and specify associated metadata such as a title and a list of actors/actresses, directors, or other associated artists. In other examples, the metadata is stored in a metadata repository and the content indication comprises a reference to the metadata in the metadata repository. It will be appreciated that any of a variety of other techniques may be used to receive content from a content source, such as using an application programming interface (API).

Flow progresses to operation 204, where a hash is generated for the content. In examples, the hash is generated by a hash generator, such as hash generator 152 in FIG. 1B. For example, the content hash may be generated based on the content itself, rather than based on the metadata either alone or in combination with the content. In examples, the content hash is part of a content record. The content record may store any of a variety of other information, such as a hash associated with the content metadata and/or the metadata itself.

At operation 206, a smart contract associated with the content is generated. The smart contract may be generated by a smart contract processor, such as smart contract processor 154 in FIG. 1B. The smart contract may be generated between any of a variety of parties, including, but not limited to, the CDN, the content source with which the indication received at operation 202 is associated, and/or musicians, actors/actresses, and directors, among other artists. A smart contract generated at operation 206 may be associated with content hash that was generated at operation 204. As noted above, a smart contract need not be between distinct users or, in other examples, a party to a smart contract need not be an actual user but may instead serve as a placeholder. The smart contract may be associated with any of a variety of triggers that cause execution of the smart contract, according to aspects described herein. While operations 206 and 208 are described as generating a single smart contract, it will be appreciated that any number of smart contracts may be generated.

Moving to operation 208, the content hash and smart contract are stored in a distributed ledger. In examples, the content record generated at operation 204 and one or more smart contracts generated at operation 206 are stored in the same distributed ledger. As another example, smart contracts may be stored in a different distributed ledger than the content record. For example, different distributed ledgers may be used for different parties (e.g., different distributed ledgers for each content source, using the same distributed ledger to track royalty payments to a specific artist, etc.). Flow terminates at operation 208.

Figure 2B:
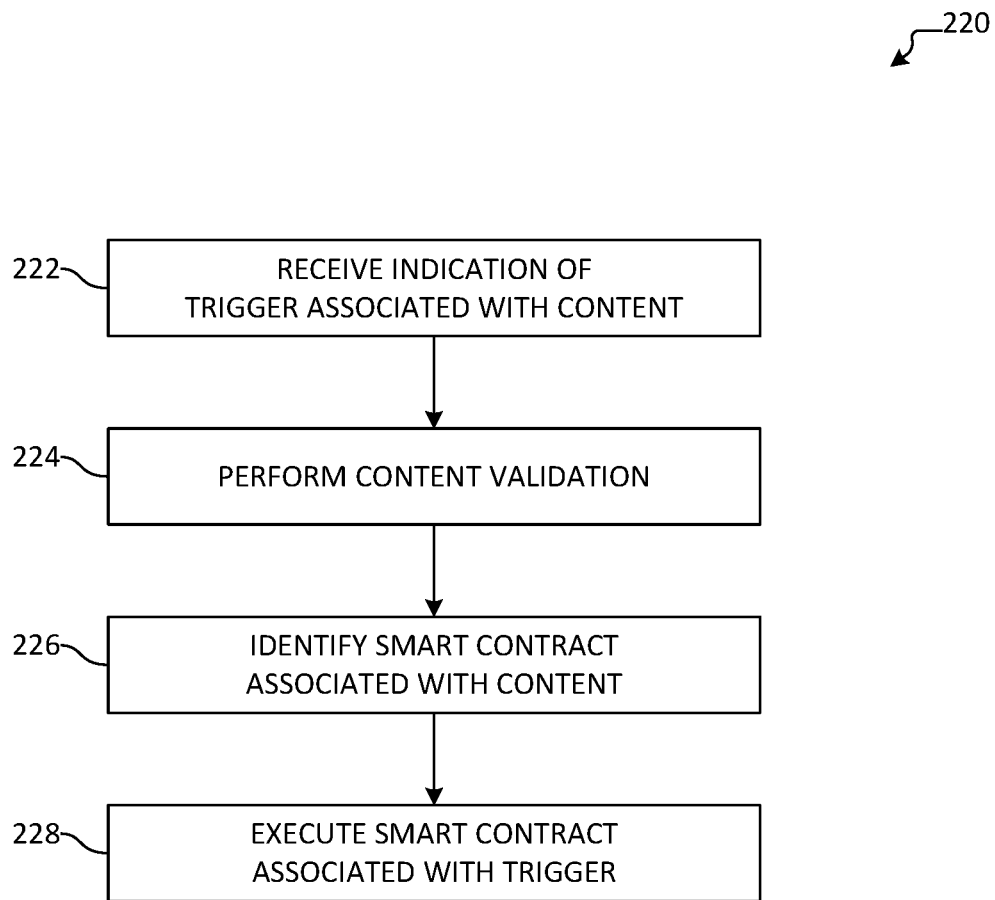
FIG. 2B illustrates an overview of an example method for processing a trigger associated with content according to the distributed ledger techniques described herein.

FIG. 2B illustrates an overview of an example method 220 for processing a trigger associated with content according to the distributed ledger techniques described herein. In examples, aspects of method 220 are performed by a node of a CDN, such as node 104, 106, or 108 in FIG. 1A. As another example, aspects of method 220 may be performed by a distributed ledger engine, such as distributed ledger engine 150 in FIG. 1B. Method 220 begins at operation 222, where an indication of a trigger associated with a piece of content is received. In examples, the indication comprises a content hash of the content and a trigger type, among other information. The indication may be received by a trigger processor, such as trigger processor 156 in FIG. 1B. In other examples, the indication is not received but is instead generated by the trigger processor.

At operation 224, content validation is performed. Content validation may be performed by a content validator, such as content validator 158 in FIG. 1B, which may be performing aspects of method 240 described below in FIG. 2C. Content validation may comprise generating a hash for the content with which the trigger is associated and comparing the hash to a hash in a content record of a distributed ledger (e.g., as may have been generated by operations 204 and 208 of method 200 in FIG. 2A). In other instances, the content hash received at operation 222 is compared to a content hash in the distributed ledger to confirm that the hashes match. In some examples, operation 224 may be omitted or may be performed depending on a type of smart contract (e.g., a smart contract associated with payments may include content validation, while a smart contract associated with analytics may not).

Flow progresses to operation 226, where a smart contract associated with the content is identified. In examples, the smart contract is stored in the same distributed ledger as the content hash, such that the smart contract may be identified therein. In other examples, the content hash is used to identify the smart contract in a different distributed ledger or, as another example, a content record may comprise a reference to the smart contract in a different distributed ledger. Thus, it will be appreciated that any of a variety of techniques may be used to identify a smart contract associated with a piece of content.

At operation 228, the smart contract that was identified at operation 228 is executed. In examples, executing the smart contract comprises generating a new record in a distributed ledger associated with the smart contract, thereby enabling later processing of the distributed ledger to generate a report (e.g., a payment invoice, analytics, etc.). In other examples, the smart contract may specify any of a variety of other actions, including generating an electronic communication, transmitting content within the CDN, and/or performing content transcoding. It will be appreciated that any number of actions may be performed at operation 228 as part of smart contract execution. Flow terminates at operation 228.

Figure 2C:
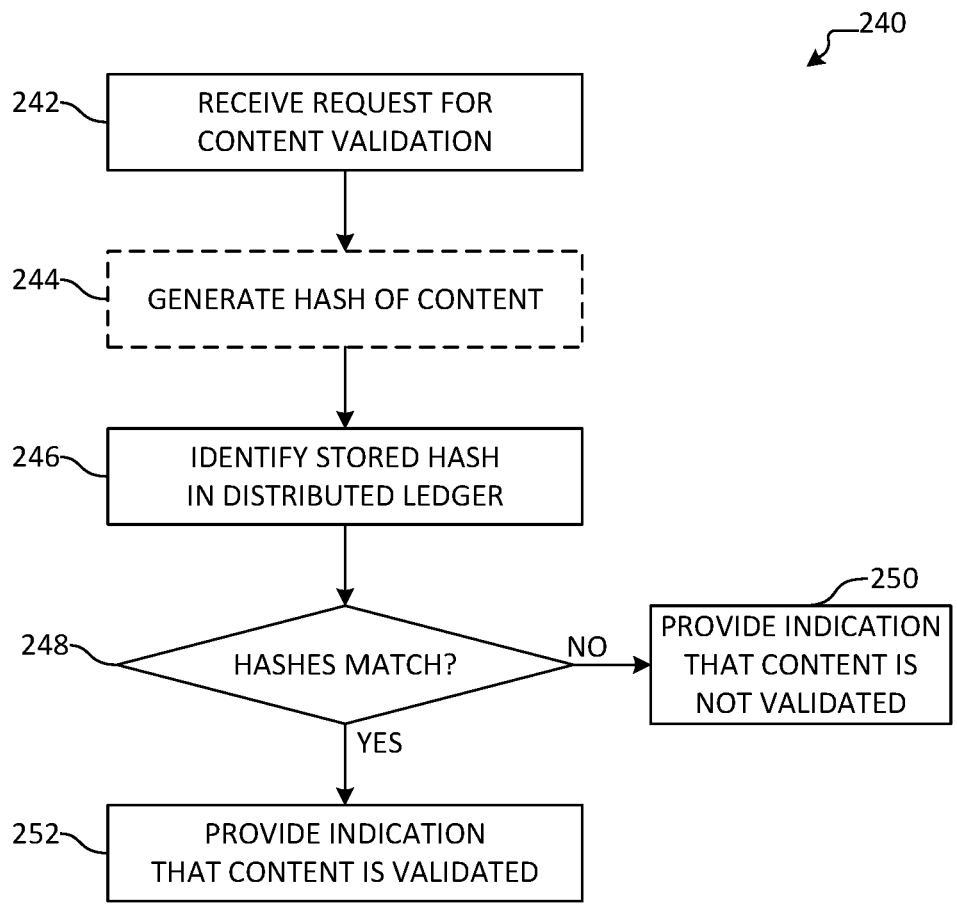
FIG. 2C illustrates an overview of an example method for validating content according to the distributed ledger techniques described herein.

FIG. 2C illustrates an overview of an example method 240 for validating content according to the distributed ledger techniques described herein. In examples, aspects of method 220 are performed by a node of a CDN, such as node 104, 106, or 108 in FIG. 1A. As another example, aspects of method 240 may be performed by a distributed ledger engine, such as distributed ledger engine 150 in FIG. 1B. Method 240 begins at operation 242, where a request for content validation is received. In examples, the request is received from a client device, such as client device 110 in FIG. 1A. In other examples, the request is received from a smart contract processor, such as smart contract processor 154 in FIG. 1B, which may be performing aspects of operation 224 in FIG. 2B. The request for content validation may comprise a content hash (e.g., as may have been generated by the client device from which the request was received).

Flow may progress to operation 244, where a hash of the content is generated. Operation 244 is illustrated using a dashed box to indicate that, in some examples (e.g., examples where the request for content validation comprises a content hash), it may be omitted. Aspects of operation 244 may be performed by a hash generator, such as hash generator 152 in FIG. 1B. As described above, the hash may be generated based on the content itself, rather than based on the metadata either alone or in combination with the content.

At operation 246, a stored hash is identified in a distributed ledger. The stored hash may be part of a content record according to aspects described herein. In examples, the content record may be associated with the content via a reference or other association. In some examples, validation may not be performed solely on the content but may also be performed on the metadata. In such examples, a stored metadata hash (e.g., which may be part of the content record) may be identified as part of operation 246. It will be appreciated that any of a variety of other techniques may be used to identify the stored hash.

At determination 248, it is determined whether the hashes match. For example, the content hash received at operation 242 or the content hash generated at operation 244 may be compared to the content hash identified at operation 246. In examples, an exact match is used. In other examples, a hash may have multiple subparts, where exact matching is used to compare a first subpart. Other subparts of the hash may be associated with a content resolution (e.g., different hashes for the subpart for HD, 4K, and/or 8K content) and/or a content source (e.g., a streaming platform may have a different hash subpart than the original content publisher). As noted above at operation 246, additional information may be evaluated as part of the determination, such as a metadata hash. In some instances, the metadata itself may be stored as part of the content record, such that matching techniques may be used to evaluate aspects of the metadata. Thus, it will be appreciated that any of a variety of techniques may be used to determine whether content hashes match, and a match need not be an exact match.

If, at determination 248, it is determined that the hashes do not match, flow branches "NO" to operation 250, where an indication is provided that the content is not validated. In examples, the indication further comprises why validation failed (e.g., a hash subpart did not match, certain metadata failed validation, etc.). Flow terminates at operation 250.

If, however, it is determined that the hashes do match, flow instead branches "YES" to operation 252, where an indication is provided that the content is validated. In some examples, the validation comprises an indication as to the validated information, more specific metadata (e.g., an inexact match may indicate that metadata is correct but incomplete, such as having actor/actress first initial and last name rather than a full name, a general year of release rather than an exact date, etc.). Flow terminates at operation 252.

Figure 3A:
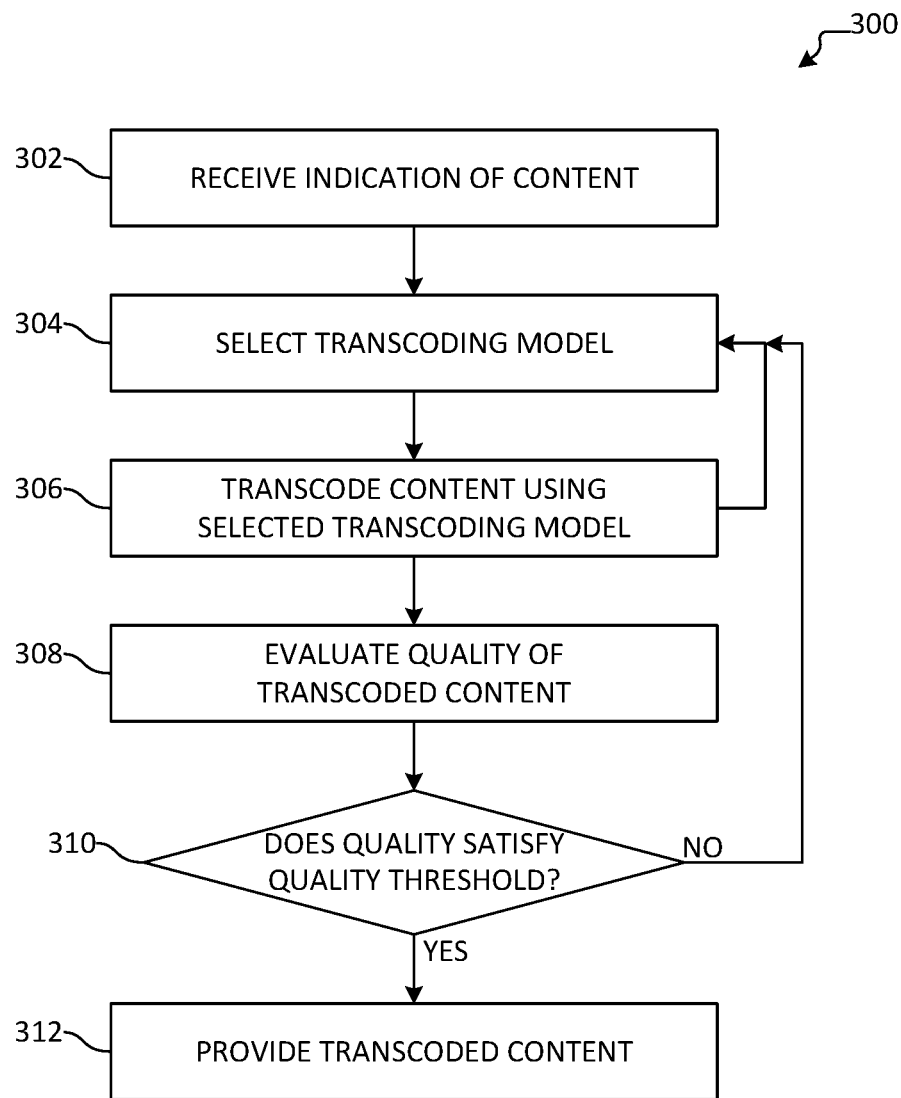
FIG. 3A illustrates an overview of an example method for transcoding content according to the AI-based transcoding technologies described herein.

FIG. 3A illustrates an overview of an example method 300 for transcoding content according to the AI-based transcoding technologies described herein. In examples, aspects of method 300 are performed by a node of a CDN, such as node 104, 106, or 108 in FIG. 1A. As another example, aspects of method 300 may be performed by a content processor, such as content processor 180 in FIG. 1C.

Method 300 begins at operation 302, where an indication of content is received. The indication of content may be received from a content source when content is being added to the CDN, such as content source 102 in FIG. 1A. In another example, the indication of content may be received from a client device when initiating playback, as may be received from client device 110 in FIG. 1A. In examples, the indication of content comprises a location at which the content was stored and a requested resolution for the content, among other requested format information (e.g., number of audio channels, audio format, color depth, etc.). The requested format information may be different than the current format of the content, for example the requested format information may specify a higher resolution or a greater number of channels. In some instances, the indication need not comprise requested format information and requested format information may instead be determined based on device characteristics (e.g., a screen size, number of speakers available, available bandwidth, etc.).

Figure 3B:
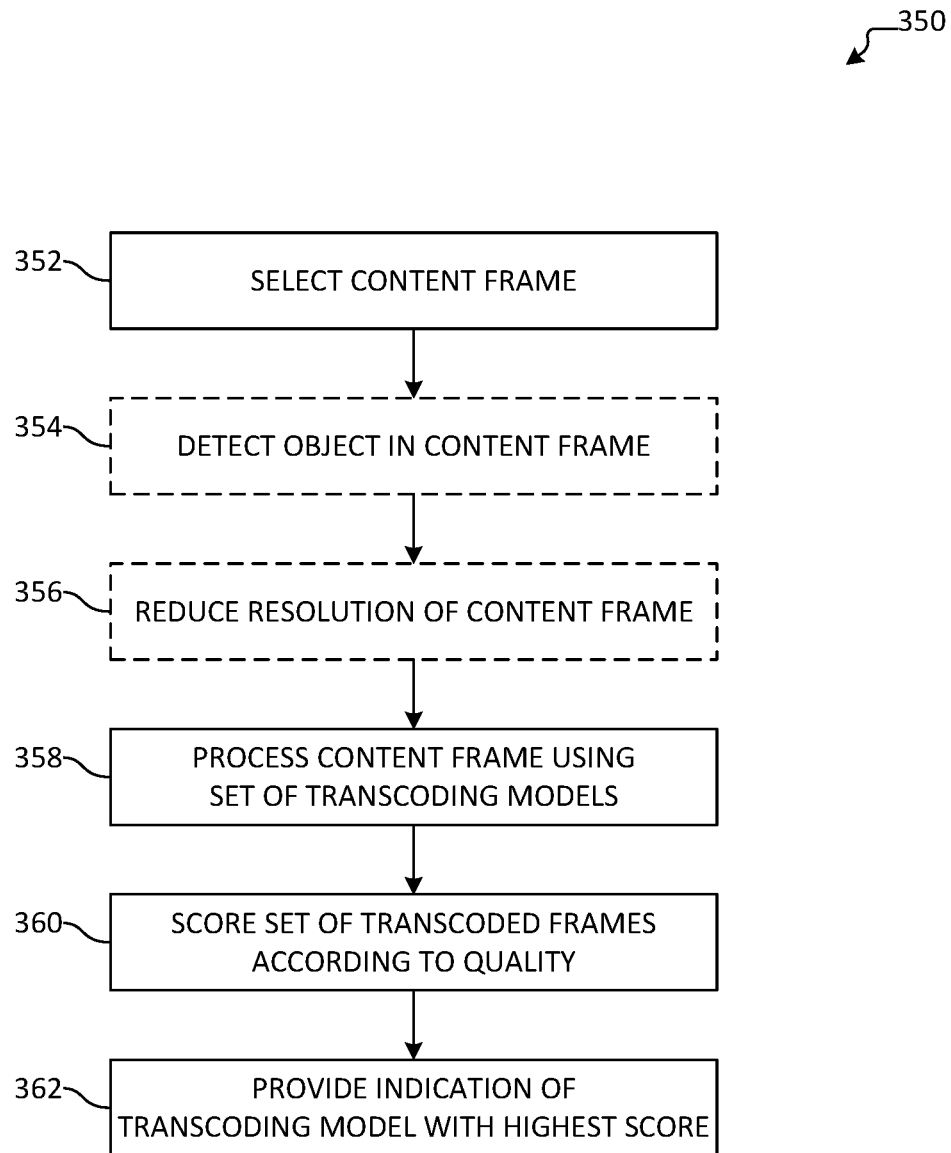
FIG. 3B illustrates an overview of an example method for selecting a transcoding model according to the AI-based transcoding technologies described herein.

Flow progresses to operation 304, where a transcoding model is selected. In examples, aspects of operation 304 are performed by a model selector, such as model selector 182 of content processor 180 in FIG. 1C. For example, a transcoding model may be selected from a set of transcoding models according to a variety of criteria, including, but not limited to, content metadata (e.g., a genre, an actor/actress that may be indicative of a certain content type, etc.), video analysis (e.g., bitrate, frame complexity, lightness/darkness, etc.), original content resolution, target content resolution, motion vectors, production year, format or codec type, and/or feedback that was received from consumers or other users. In some examples, operation 304 comprises comparing multiple transcoding models to determine which transcoding model to apply. Method 350 of FIG. 3B illustrates an example of such aspects, and is discussed below in further detail.

At operation 306, the content is transcoded using the transcoding model selected at operation 304. The transcoding may be performed by a transcoding engine, such as transcoding engine 186. According to aspects described herein, multiple transcoding models maybe used to transcode the content. For example, a first subpart may be transcoded according to a model selected at operation 304, after which transcoding may pause and flow may return to operation 304 to select a new transcoding model for a second subpart of the content. Such aspects are illustrated by the arrow from operation 306 to operation 304. Thus, transcoding model performance may be evaluated periodically by returning to operation 304, such that the transcoding model may be changed depending model performance for a given subpart. In some examples, content resolution may change, which may cause flow to return to operation 304. In other examples, object detection may be used to determine the content of a video frame or identify when an object has disappeared, both of which may cause flow to return to operation 304. In some instances, the transcoding model that is applied may be reevaluated on a frame-by-frame basis or according to any other level of granularity (e.g., every keyframe or intraframe, after a predetermined number of frames, etc.). Further, while operations 304 and 306 are described as occurring sequentially, it will be appreciated that, in other aspects, subpart transcoding may occur in parallel, where different subparts are contemporaneously transcoded according to different transcoding models.

Finally, as previously noted, different transcoding models may be applied to intraframes, predicted-frames, and/or bidirectional-frames. Thus, operation 306 need not be restricted to applying a single transcoding model to transcode the content. Rather, operation 306 may alternate transcoding models while transcoding the content. As another example, a first transcoding model may be used to transcode a video track of the content and a second transcoding model may be used to transcode an audio track of the content. It will be appreciated that a variety of techniques may be used to determine when to shift from one transcoding model to another transcoding model in order to transcode content.

In other examples, operation 304 may be omitted and operation 306 may instead be performed based at least in part on a transcoding recipe that specifies which transcoding models should be used to transcode which subparts of content. The transcoding recipe may be associated with a requested resolution, a number of audio channels, a bit rate, and/or a color depth, among other examples, such that the transcoding recipe may be identified based on requested format information provided in a request for content (e.g., as was received at operation 302). In such examples, method 300 comprising operation 304 may have been performed at another node or, as another example, operation 306 may have been omitted such that the transcoding recipe is generated prior to any such transcoding.

Flow progresses to operation 308, where the quality of the transcoded content is evaluated. Operation 308 may be performed after content transcoding has finished or, in other examples, may be periodically performed during transcoding. Aspects of operation 308 may be performed by a quality evaluator, such as quality evaluator 188 of content processor 180 in FIG. 1C. For example, the determination may be made programmatically (e.g., by detecting transcoding artifacts, comparing a reference frame to the transcoded frame, etc.) and/or may be based on explicit/implicit user input. User input may be historical user input based on previously transcoded content using the same or a similar transcoding model, where a user indicates the perceived quality of the transcoded content (e.g., on a scale from one to five, a binary indication whether the quality was good, etc.).

At determination 310, it is determined whether the quality satisfies a threshold. In examples, a predetermined error rate or quality loss is compared to the evaluation performed at operation 308. In other examples, a predetermined score threshold is compared to user input. It will be appreciated that any of a variety of other techniques and/or metrics and associated thresholds may be used to assess quality. If, at determination 310, it is determined that the quality threshold is not met, flow branches "NO" and returns to operation 304, where a different transcoding model may be used to transcode the content. As used herein, a transcoding model may further comprise various settings or other variables, such that a different transcoding model may comprise applying the same base transcoding model with changed settings and/or variables.

If, however, it is determined that the transcoded content satisfies the quality threshold, flow instead branches "YES" to operation 312, where the transcoded content is provided. In examples, the transcoded content is provided to a client device for playback to a consumer. In other examples, the transcoded content is transmitted to a node of the CDN for storage and/or subsequent transmission to one or more consumers. Method 300 need not be limited to pre-recorded content and similar techniques may be used for streaming or real-time content, among other examples. Method 300 terminates at operation 312.

FIG. 3B illustrates an overview of an example method 350 for selecting a transcoding model according to the AI-based transcoding technologies described herein. In examples, aspects of method 350 are performed by a node of a CDN, such as node 104, 106, or 108 in FIG. 1A. As another example, aspects of method 350 may be performed by a content processor, such as content processor 180 in FIG. 1C. Aspects of method 350 may be performed as part of operation 304 of method 300 in FIG. 3A.

Method 350 begins at operation 352, where a content frame is selected. In examples, the selected content frame is a frame to be transcoded by a content processor, as may be performing aspects of method 300 in FIG. 3A. In other examples, the selected content frame is a keyframe or a frame that is determined to be representative of the content. For example, the frame may be selected as a result of having a relatively high degree of motion or detail, among other examples.

At operation 354, an object is detected in the selected content frame. Aspects of operation 354 may be performed by an object detector, such as object detector 184 in FIG. 1C. Operation 354 may comprise identifying one or more inanimate objects, animated characters, and actors/actresses, among other objects. The selected content frame may be processed according to any number and/or variety of object recognition machine learning models. For example, each object recognition machine learning model may have been trained to recognize a specific subset of objects or, in other examples, an object recognition machine learning model is trained according to a specific type of content. It will be appreciated that any of a variety of other object detection techniques may be used (e.g., identifying edges within a frame, analyzing motion across a set of frames, etc.). Operation 354 is illustrated using a dashed box to indicate that, in other examples, operation 354 may be omitted such that the model selection techniques of method 350 may not evaluate model performance specifically with respect to detected objects.

Flow may progress to operation 356, where the resolution of the content frame is reduced. In examples, the reduced resolution is determined based on the amount of visual data that is to be generated using the AI-based transcoding techniques described herein. For example, upscaling 1080p HD (e.g., 1920×1080) content to 4K content (e.g., 3840× 2160) results in a four-fold increase in pixel data. Accordingly, a 1080p HD source may be downscaled by a factor of four (e.g., to 960×540) at operation 356. It will be appreciated that any number of other downscaled resolutions may be used. Operation 356 is illustrated using a dashed box to indicate that, in other examples, operation 356 may be omitted. For example, operation 356 may be omitted when model processing results are compared to each other without a comparison to a source content frame.

At operation 358, the content frame is processed using a set of transcoding models. In examples, processing the content frame comprises upscaling a downscaled content frame (e.g., as was generated at operation 356) using each transcoding model to yield transcoded content frames having a resolution that is the same as or similar to the original content frame that was selected at operation 352. In some instances, transcoding the content frame comprises utilizing the same base model but altering settings or variables used to transcode the content frame. The set of transcoding models used at operation 358 maybe at least a subset of transcoding models used by the CDN to transcode content. In some examples, the set of transcoding models is selected according to a variety of criteria, including, but not limited to, content metadata (e.g., a genre, an actor/actress that may be indicative of a certain content type, etc.), video analysis (e.g., bitrate, frame complexity, lightness/darkness, etc.), original content resolution, target content resolution, motion vectors, production year, format or codec type, and/or feedback that was received from consumers or other users.

Flow progresses to operation 360, where the set of transcoded content frames is scored according to quality. In examples, the transcoded content frames are scored programmatically (e.g., by detecting transcoding artifacts, comparing a reference frame to the transcoded frame, etc.) and/or may be based on explicit/implicit user input. The transcoded content frames may be scored individually, scored relative to one another, and/or scored based on the content frame that was selected at operation 352. As described above, user input may be received from a display of transcoded frames side-by-side or may be historical user input based on previously transcoded content using the same or a similar transcoding model, among other examples. In examples, aspects of operation 360 are performed by a quality evaluator, such as quality evaluator 188 of content processor 180 in FIG. 1C.

At operation 362, an indication is provided of the transcoding model with the highest score. In examples, the indication is provided to a transcoding engine, such as transcoding engine 186 of content processor 180 in FIG. 1C. As an example, the indication may be used at operation 306 of method 300 in FIG. 3A to transcode content. In examples, the indication comprises the transcoded content frame, such that the transcoding engine need not re-transcode the content frame that was selected at operation 352. While method 350 is described as selecting and processing a single content frame, it will be appreciated that, in other examples, multiple content frames may be processed. For example, method 350 may determine a transcoding model for a set of frames, after which the model selection process may be performed again to identify the same or a different transcoding model. In such examples, the indication comprises an indication of the content subpart for which the transcoding model should be used (e.g., a number of frames, according to a timestamp, etc.). Flow terminates at operation 362.

Figure 4:
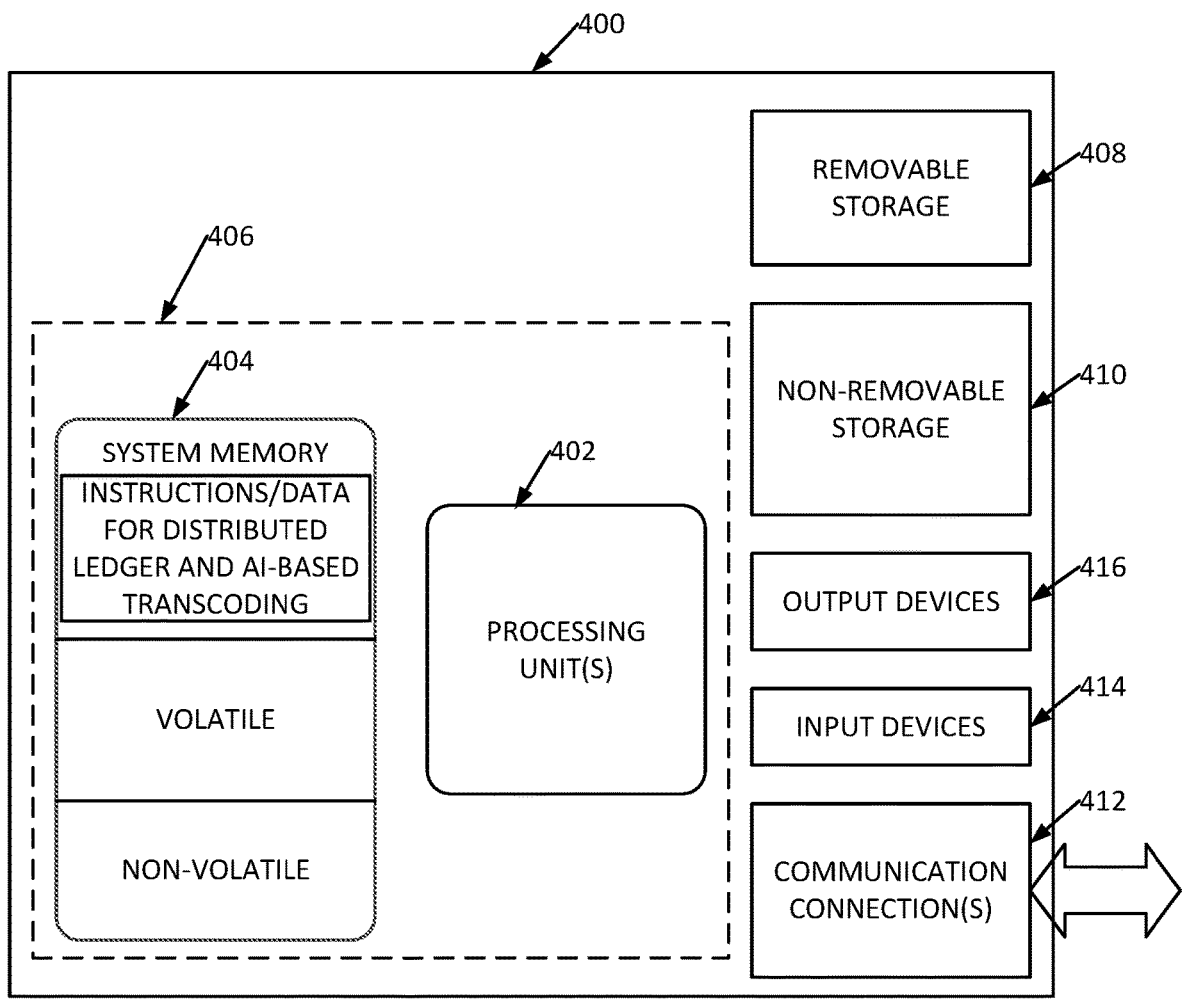
FIG. 4 illustrates an example of a suitable operating environment in which one or more of the present embodiments may be implemented.

FIG. 4 illustrates an example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically may include at least one processing unit 402 and memory 404. Depending on the exact configuration and type of computing device, memory 404 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as a keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 may include at least some form of computer readable media. The computer readable media may be any available media that can be accessed by processing unit 402 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 404. While executing on the processing unit 402, program modules (e.g., applications, Input/Output (I/O) management, and other utilities) may perform processes including, but not limited to, one or more of the stages of the operational methods described herein such as the methods illustrated in FIGS. 2A-2C and 3A-3B, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 400 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A system comprising:
at least one processor; and
memory, operatively connected to the at least one processor and storing instructions that, when executed by the at least one processor, cause the system to perform a set of operations, the set of operations comprising:
receiving, from a content source, an indication of content;
storing the content in a data store;
generating a content hash based on the content;
storing the content hash as a content record in a distributed ledger;
receiving, from a client device, a request for the content; [and]
providing, in response to the request, at least a part of the content from the data store;
generating a smart contract associated with the content, wherein the smart contract is associated with a trigger;
identifying the trigger based on the request for the content from the client device;
in response to identifying the trigger, executing the smart contract to generate a new record in the distributed ledger;
processing the distributed ledger to identify at least the new record;
generating, based at least in part on the new record, an accounting indication associated with the content; and
providing the accounting indication to the content source.

2. The system of claim 1, wherein the content hash is a first content hash and the set of operations further comprises:
receiving, from the client device, a validation request comprising a second content hash;
determining that the content is validated when the first content hash matches the second content hash; and
in response to the validation request, providing an indication that the content is validated.

3. The system of claim 1, wherein:
the indication of content further comprises metadata associated with the content; and
the metadata is not used to generate the content hash.

4. The system of claim 3, wherein at least a part of the metadata is stored in the content record.

5. The system of claim 3, wherein at least a part of the metadata is stored in a metadata repository and associated with the content hash.

6. A method for generating a smart contract for content of a content distribution network (CDN), the method comprising:
receiving, from a content source, an indication of content;
generating a smart contract associated with the content, wherein the smart contract is associated with a trigger;
storing the smart contract in a distributed ledger;
receiving, from a client device, a request for the content;
identifying the trigger based on the request for the content from the client device;
in response to identifying the trigger, executing the smart contract to generate a new record in the distributed ledger;
providing, in response to the request, at least a part of the content;
processing the distributed ledger to identify at least the new record;
generating, based at least in part on the new record, an accounting indication associated with the content; and
providing the accounting indication to the content source.

7. The method of claim 6, further comprising:
generating a content hash based on the content;
storing the content hash as a content record in the distributed ledger.

8. The method of claim 7, wherein the content hash is a first content hash and the method further comprises:
receiving, from the client device, a validation request comprising a second content hash;
determining that the content is validated when the first content hash matches the second content hash; and
in response to the validation request, providing an indication that the content is validated.

9. The method of claim 7, wherein:
the indication of content further comprises metadata associated with the content; and
the metadata is not used to generate the content hash.

10. The method of claim 6, wherein the content is a subpart of streaming content from the content source.

11. A method for adding content to a content distribution network (CDN), the method comprising:
receiving, from a content source, an indication of content;
storing the content in a data store;
generating a content hash based on the content;
storing the content hash as a content record in a distributed ledger;
receiving, from a client device, a request for the content;
providing, in response to the request, at least a part of the content from the data store;
generating a smart contract associated with the content, wherein the smart contract is associated with a trigger;
identifying the trigger based on the request for the content from the client device;
in response to identifying the trigger, executing the smart contract to generate a new record in the distributed ledger;
processing the distributed ledger to identify at least the new record;
generating, based at least in part on the new record, an accounting indication associated with the content; and
providing the accounting indication to the content source.

12. The method of claim 11, wherein the content hash is a first content hash and the method further comprises:
receiving, from the client device, a validation request comprising a second content hash;
determining that the content is validated when the first content hash matches the second content hash; and
in response to the validation request, providing an indication that the content is validated.

13. The method of claim 11, wherein:
the indication of content further comprises metadata associated with the content; and
the metadata is not used to generate the content hash.

14. The method of claim 13, wherein at least a part of the metadata is stored in the content record.

15. The method of claim 13, wherein at least a part of the metadata is stored in a metadata repository and associated with the content hash.

* * * * *